Aug. 14, 1934.  E. I. SCHWARZ  1,970,398
PACKING CUP FOR MASTER CYLINDERS
Filed Jan. 6, 1934
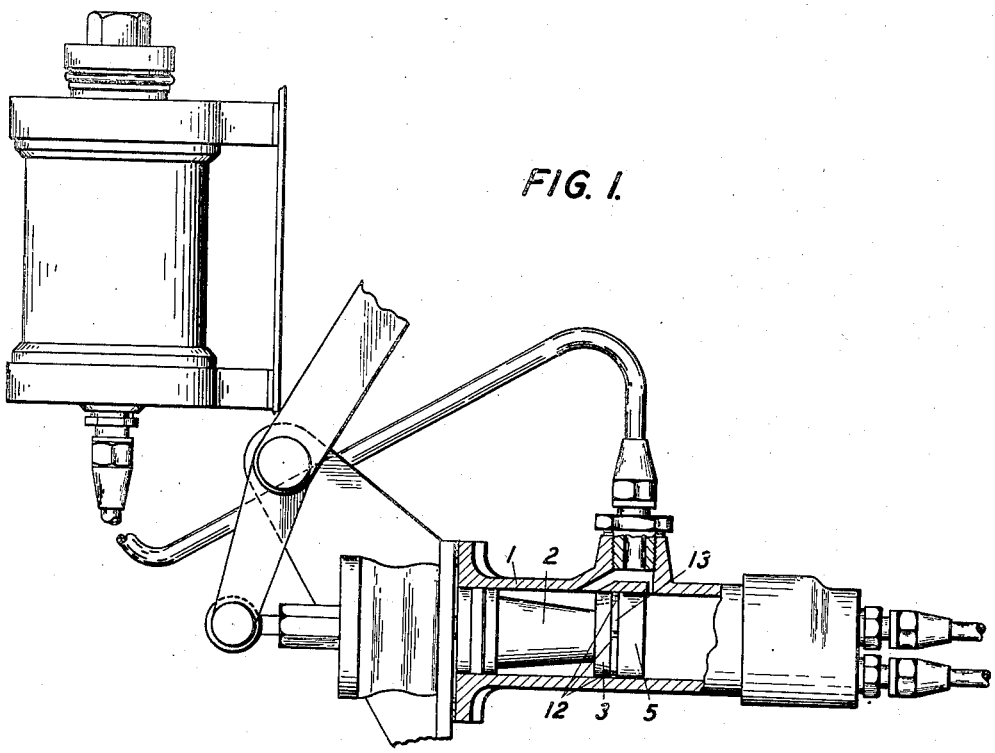
FIG. 1.
FIG. 2.
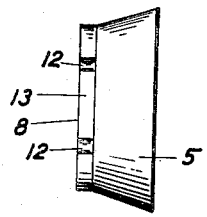
FIG. 3.
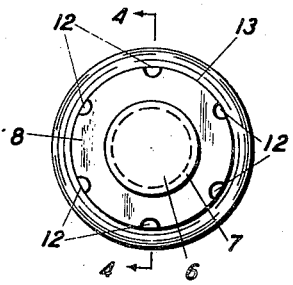
FIG. 4.
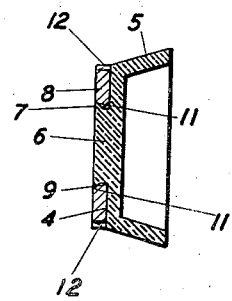
FIG. 5.
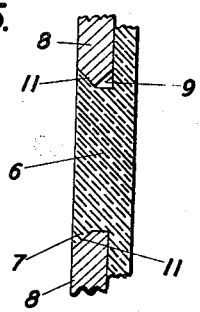
INVENTOR
Ernest I. Schwarz
BY
Harvey Lea Dodson
ATTORNEY Patented Aug. 14, 1934

1,970,398

UNITED STATES PATENT OFFICE 1,970,398

PACKING CUP FOR MASTER CYLINDERS

Ernest I. Schwarz, Bronx, N. Y.

Application January 6, 1934, Serial No. 705,505

4 Claims. (Cl. 309—33)

My invention relates principally to those cylinders which are used in hydraulic braking systems on automobiles although it will be apparent from the hereinafter contained description that it can be useful in other types of cylinders as well.

It has been found in practice that it is desirable to provide a construction for such cups which will permit it to allow the fluid when subject to pressure to contract and allow the fluid to pass in one direction, although when the cup is moving in the other or opposite direction, the pressure of the fluid will expand the walls of the cup against the cylinder walls and thus prevent any fluid from passing it.

In the past one way of accomplishing this is by providing a rubber cup with an annular groove in the periphery of the cup walls and then connecting said groove by means of a plurality of grooves at right angles to the said annular groove. When such a cup is new it operates fairly satisfactorily but its life is of very short duration as the cup wears very rapidly, especially those portions which lie between the grooves which lead to the annular groove, moreover it is necessary to have the exterior surface of the cup walls almost, if not quite, parallel to the cylinder walls. This construction is objectionable for the reason that the cup walls will seal better if they are inclined from the bottom to their edge.

Experience has proved that when the cup wears, it no longer functions properly and as a consequence the brakes will not operate.

My invention has for its principal object to provide a construction which will almost entirely avoid the above objections and which will outlast a rubber cup many times.

A further object is to so construct the cup so that the outer surface of the wall can be inclined from the wall of the cylinder, thereby materially increasing its ability to seal the cylinder.

My means of accomplishing the foregoing obects may be more readily understood by having reference to the accompanying drawing which is hereunto annexed and is a part of this specification, in which—

Fig. 1 is a view of a master cylinder and a portion of a hydraulic brake system;

Fig. 2 is an enlarged side elevation of my improved packing cup;

Fig. 3 is an end elevation of the same;

Fig. 4 is a section taken on the line 4—4 in Fig. 3; and

Fig. 5 is a fragmentary detail view.

Similar reference numerals refer to similar parts throughout the entire description.

As shown in the drawing, the master cylinder 1 has a piston 2 mounted therein, as this is standard construction, I shall not describe the details of construction since it is well known to those persons skilled in the art. At one end 3 of the piston 2 is mounted the packing cup. This cup is formed of a rubber cup having a bottom 4 and side or cup walls 5. The bottom 4 is provided with a laterally extending hub or boss 6 which has a peripheral flange 7 formed on it. Mounted upon the hub 6 is a metallic disc 8 which is preferably formed of aluminum. This disc 8 has a central opening 9 formed therein which fits the hub 6, the walls of the disc 8 adjacent the flange 7 is chamfered as at 11 so as to fit the flange 7 on the hub 6. This holds the disc 8 securely in place. Notches 12 are formed in the outer edge 13 of the disc 6.

The result is obvious as the edges 13 intermediate the notches 12 bear against the walls of the cylinder 1. It is clear that being of metal the disc will outwear rubber many times so that there is practically no danger of the packing cup deteriorating and thus destroying the utility of the brake.

Having described my invention what I regard as new and desire to secure by Letters Patent is—

1. In combination, a hydraulic cylinder, a piston reciprocable therein, and a packing, said packing being unattached to said piston and comprising a rubber cup and a backing disk detachably secured to said cup, said disk having a plurality of axial notches formed in its peripheral surface.

2. In combination, a hydraulic cylinder, a piston reciprocable therein, and a packing, said packing being unattached to said piston and comprinsing a rubber cup, a hub formed integral with said cup and extending outwardly from the bottom of said cup, an annular flange on said hub, a metallic disk mounted on said hub, said cup and disk being of substantially the same diameter as said piston, there being a plurality of notches in the periphery of said metallic disk, said notches extending for the full thickness of said disk.

3. A packing cup for use in a hydraulic cylinder having a piston reciprocable therein, a hub formed integral with said cup and extending outwardly from the bottom of said cup, an annular inwardly tapered flange on said hub, a metallic disk mounted on said hub, said cup and disk being of substantially the same diameter as said piston, there being a plurality of notches in the periphery of said metallic disk, said notches extending for the full thickness of said disk.

4. A packing cup for use in a hydraulic cylinder having a piston reciprocable therein, a hub formed integral with said cup and extending outwardly from the bottom of said cup, an annular flange on said hub, a metallic disk mounted on said hub, said cup and disk being of substantially the same diameter as said piston, there being a plurality of notches in the periphery of said metallic disk, said notches extending for the full thickness of said disk.

ERNEST I. SCHWARZ.